March 2, 1965     W. S. BAIRD     3,171,882

SPECTROSCOPIC APPARATUS

Filed April 24, 1962     2 Sheets-Sheet 1

INVENTOR.
Walter S. Baird
BY Morse & Altman
ATTORNEYS

March 2, 1965  W. S. BAIRD  3,171,882
SPECTROSCOPIC APPARATUS
Filed April 24, 1962  2 Sheets-Sheet 2

INVENTOR.
Walter S. Baird
BY
Morse & Altman
ATTORNEYS

United States Patent Office 3,171,882
Patented Mar. 2, 1965

3,171,882
SPECTROSCOPIC APPARATUS
Walter S. Baird, Lexington, Mass., assignor to Baird-Atomic, Inc., Cambridge, Mass., a corporation of Massachusetts
Filed Apr. 24, 1962, Ser. No. 189,794
4 Claims. (Cl. 88—14)

The present invention relates to spectrum analysis and, more particularly, to spectrometers of the so-called "direct reading" type which automatically indicate the chemical composition of a specimen by determining the intensity distribution of radiation of characteristic wavelengths emitted by the specimen under excitation.

By way of example, a typical direct reading spectrometer comprises an entrance slit that transmits radiation from an electrically excited specimen, a diffraction grating that forms a spectrum from radiation so transmitted, and a plurality of exit slits that transmit radiation of preselected wavelengths to photocells in order to determine the differing intensities of the radiation at these wavelengths. In a typical prior spectrometer readout, the outputs of the photocells are directed to capacitors, which build up charges that indicate the intensities of the preselected wavelengths. Problems have been encountered in the calibration of such a capacitor readout. The present invention contemplates a novel spectrometer readout characterized by reduced delicacy of adjustment and increased high precision.

Primary objects of the present invention are: to utilize a plurality of radiation sources in a spectrometer for the production of a plurality of co-existing but differently oriented spectra for the purpose of comparing selected wavelengths as an indication of composition; and specifically to combine, with the usual dispersion and measurement of the specimen radiation from the sample, the auxiliary dispersion and measurement of reference radiation from at least one standard and the comparison of selected like wavelengths of the specimen radiation and the standard radiation to indicate the intensities of the selected wavelengths of the sample. Thus, in the system of the present invention, a sample having a composition that is approximately known, is compared with a standard having a composition that is precisely known, the comparison being made in such a way that, by using the method of differences, unprecedented precision is possible.

Other objects of the present invention will in part be obvious and will in part appear hereinafter.

The invention accordingly comprises the apparatus possessing the features, properties and relation of components that are exemplified in the following detailed disclosure, the scope of which will be indicated in the appended claims.

For a fuller understanding of the nature and objects of the present invention, reference should be had to the following detailed description, taken in connection with the accompanying drawings wherein.

Figure 1:
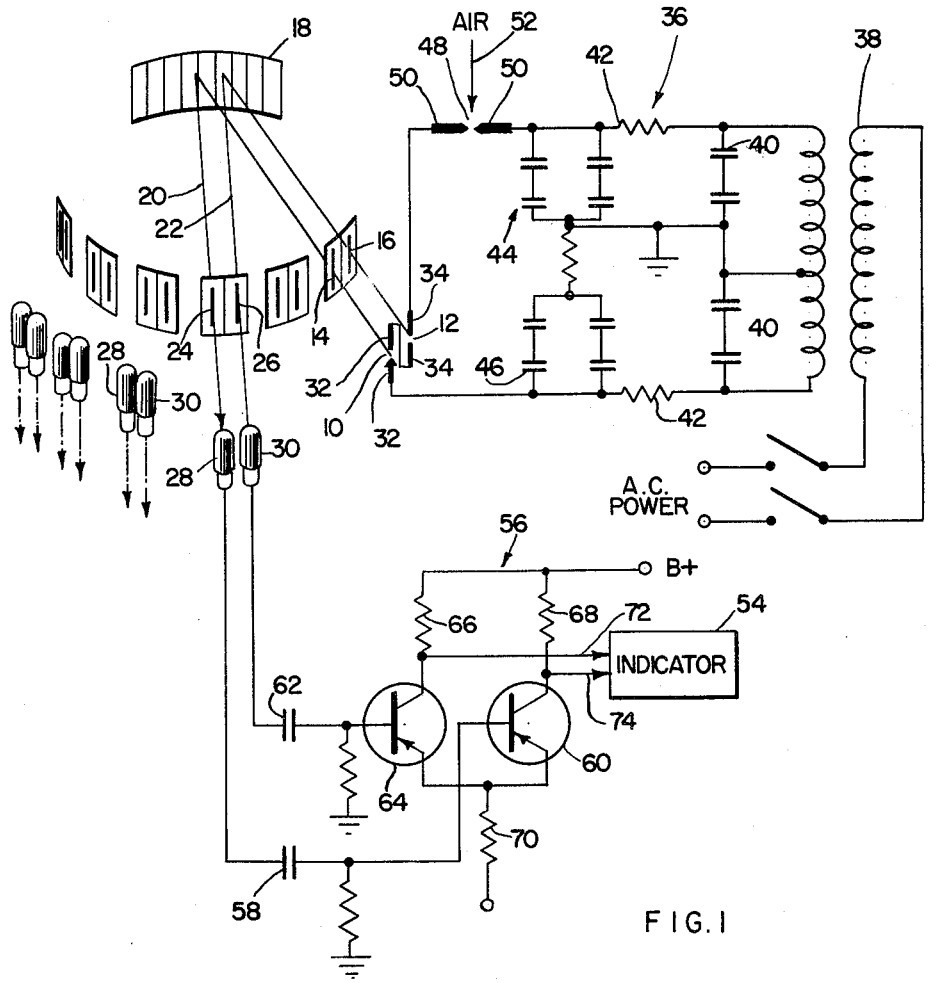
FIG. 1 is a diagram, partly in mechanical perspective and partly in electrical schematic, of a preferred embodiment of the present invention.

Generally, the embodiment of the present invention illustrated in FIG. 1 comprises a pair of electrically excited gaps 10, 12 for an unknown specimen and a standard specimen, a pair of entrance slits 14, 16 for radiation from gaps 10, 12, a curved diffraction grating 18 for dispersing radiation from entrance slits 14, 16 into a pair of spectra, rays of which are shown at 20 and 22, and a plurality of pairs of exit slits each designated 24, 26 for transmitting isolated pairs of wavelengths of the pair of spectra from grating 18. A plurality of pairs of photocells 28, 30 are provided to receive the pairs of wavelengths. Each pair of photocells generate signals for a wavelength intensity comparison to be described below.

Unknown specimen gap 10 and standard specimen gap 12 are defined by pairs of carbon electrodes 32, 32 and 34, 34. These electrodes are energized by the circuit 36 now to be described. Circuit 36 is an alternating current spark source comprising a transformer 38, the primary of which is energized by a line voltage for example, 220 volts A.C., and the secondary of which develops an open circuit voltage, for example, 25,000 volts. Connected across the secondary of the transformer are a bank 40 of four small capacitors which, in combination with two resistors 42, 42 form a frequency filter network for protection of the transformer. Any high frequency currents flowing back from the oscillatory portion of the circuit pass safely through these capacitor networks in such a way as to avoid overloading the transformer. Resistors 42, 42, which for example are 5,000 ohms each, also act as secondary current limiting elements so that in the event of oscillatory circuit failure, the transformer will not suffer a direct short circuit. Connected between the output extremities of resistors 42, 42 are banks 44 and 46 of capacitors, across which in series are specimen and standard gaps 10 and 12. Also in series with gaps 10 and 12 is an auxiliary air gap 48, which is defined by a pair of electrodes 50, 50. The operation is such that incoming current builds up a charge on capacitor networks 44 and 46 until the resulting potential across the networks is large enough to break down air gap 48. Immediately, current flows through air gap 48 as well as through specimen and standard gaps 10 and 12, generating a sequence of very high frequency oscillations. These high frequency oscillations are soon damped out by the reactance of the air gaps, capacitor network and wiring. A continuous blast of air 52 is directed through auxiliary gap 40 and the ionized air in this gap is immediately replaced with fresh, unionized air. The charge on the capacitor network now builds up again, and again the gap is broken down by initiating a new sequence of high frequency oscillations.

The charge-discharge action in this circuit is extremely rapid, the oscillations being at very high frequencies which are not dependent on the 60 cycle power alternating current power input to transformer 38. This very high frequency is of the order of two megacycles, with a very wide band width. The transformer supplies only enough energy to the loop to keep it operative, compensating only for the energy actually dissipated by the resistive elements in the circuit. It will be understood that the auxiliary gap 48 may be eliminated and that one of gaps 24 or 26 could be subjected to the air blast instead.

The outputs of pairs of phototubes 28 and 30 are applied to indicators, one of which is shown at 54, through channels, one of which is shown at 56. As shown, in each channel, photodetector 28 is resistively-capacitively coupled as at 58 to one stage 60 of a differential amplifier and photodetector 30 is resistively-capacitively coupled as at 62 to the other stage of the differential amplifier. Stages 60 and 64 of this differential amplifier include a pair of transistors, the bases of which are connected respectively to the output of capacitors 58 and 62. The collectors of transistors 60 and 64 are connected to B+ through a pair of resistors 66 and 68. The emitters of transistors 60 and 64 are connected to B— through a common resistor 70. The collector of transistor 60 and the collector of transistor 64 are connected via output leads 72 and 74 to an indicator 54. These output leads provide a differential analogue voltage which corresponds to the difference in intensities of the signals produced by phototubes 28 and 30. As indicated above, this difference is a very accurate indication of the concentration of a particular element in the sample when the standard is known.

Figure 2:
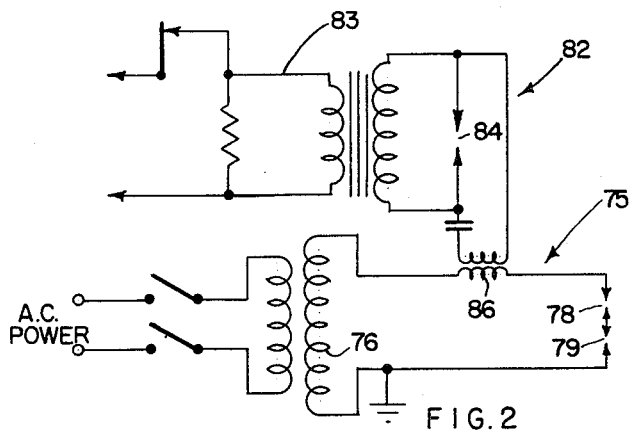
FIG. 2 is an electrical schematic of an alternative component for use in connection with the embodiment of FIG. 1.

The circuit of FIG. 2 illustrates an arc generating circuit capable of being substituted for circuit 36 of FIG. 1 as for example, in the case where particular spectrum lines, e.g. of tin and boron in steel, can be distinguished from spectral background only if an arc source is used. This type of excitation generally is not as reproducible as spark source excitation so that it is used only when essential. As shown in FIG. 2, this source comprises an arc circuit 75 including a transformer 76 which supplies current to a pair of arc sources 78 and 79. Transformer 76 has sufficient built-in leakage to be self current limiting and has a secondary voltage high enough for the arc to be self sustaining. The ignitor circuit 82, which is energized as at 83, produces a high voltage spark discharge at 84 which is inductively coupled to gaps 78 and 79 by an air transformer 86. Spacing of the ignitor gap in this circuit is fairly critical. When this gap is too narrow, the energy coupled to analytical gaps 78 and 79 is to small to ignite the arcs. When it is too wide, the ignitor transformer voltages does not break down the air in ignitor gap 84 and again there is no ignition of arcs 78 and 79. Beyond adjustment of this ignitor gap, there are no controllable variables in the arc source which require the operator's attention.

Figure 3:
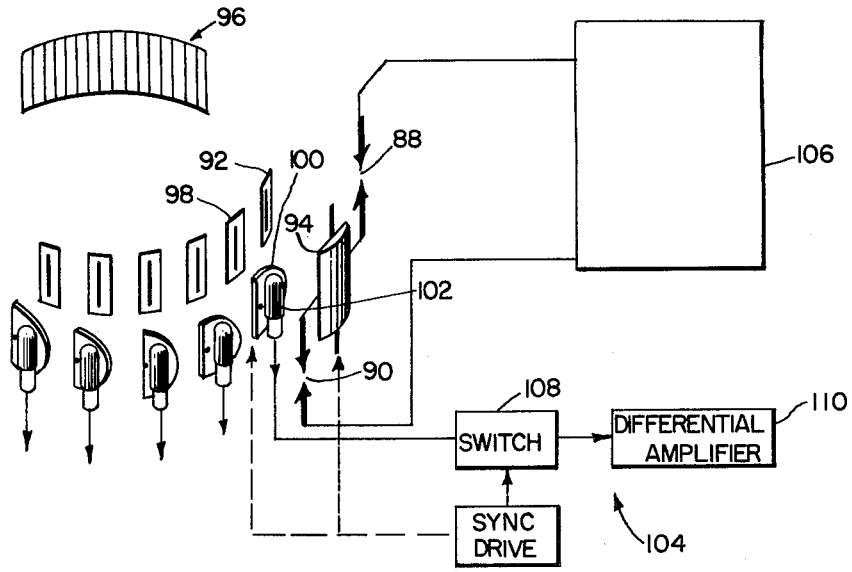
FIG. 3 is a diagram, partly in mechanical perspective and partly in electrical schematic, of an alternative embodiment of the present invention.

FIG. 3 illustrates an alternative embodiment of the present invention comprising a pair of electrically excited gaps 88, 90 for an unknown specimen and a standard specimen, an entrance slit 92 for radiation from gaps 88, 90, a rotatable mirror chopper 94 for transmitting alternately radiation from gap 88 and gap 90 through entrance slit 92, a curved diffraction grating 96 for dispersing radiation from entrance slit 92 into a pair of spectra characteristic of gaps 88 and 90 and a plurality of exit slits 98 for transmitting isolated wavelengths of the pair of spectra alternately. A plurality of choppers 100 are provided for subjecting a plurality of photodetectors 102 to the alternate wavelengths. Controls, one channel of which is shown at 104, compare the intensities of the alternate wavelengths. As shown, gaps 88 and 90 are excited by means of circuitry 106 analogous to its counterpart in FIG. 1. Each of control channels 104 includes a synch drive for rotating choppers 94 and 100 in synchronism and for gating a switch 108 in such a way as to apply signals, representing the alternate wavelengths applied to photodetector 102, to a differential amplifier 110.

In operation, the embodiment of FIG. 3 is similar to that of FIG. 1 except that the signals being compared are separated in time rather than in space.

Figure 4:
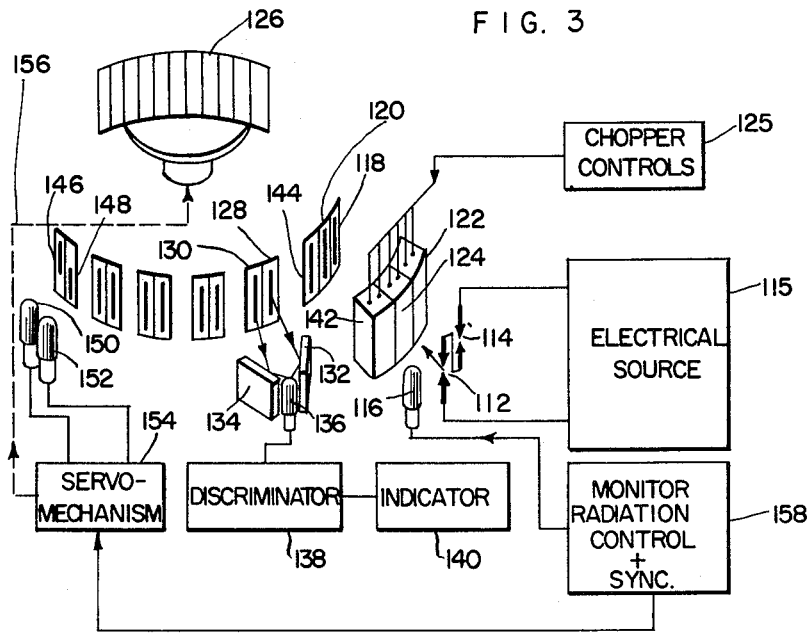
FIG. 4 is a diagram, partly in mechanical perspective and partly in electrical schematic, of another alternative embodiment of the present invention.

FIG. 4 illustrates an alternative embodiment of the present invention comprising a pair of electrically excited gaps 112, 114 for an unknown specimen and a standard specimen and a source of monitor radiation 116. Gaps 112, 114, which are energized by a power source 115, constitute parts of a subsystem embodying the present invention. Source of monitor radiation 116 constitutes part of a subsystem designed to provide servo control over the relative orientations and positions of the entrance slits, grating and exit slits in accordance with U.S. Patent No. 2,837,959, issued on June 10, 1958, in the names of Jason L. Saunderson et al., for "Automatic Means for Aligning Spectroscopic Components," and U.S. Patent No. 2,937,561, issued on May 24, 1960, in the names of Jason L. Saunderson et al., for "Spectroscopic Apparatus."

The subsystem of gaps 112, 114 operates as follows. A pair of entrance slits 118, 120 direct radiation from gaps 112, 114 and through a pair of electro-optic shutters 122, 124 to a grating 126. Grating 126 disperses radiation from entrance slits 118, 120 into a pair of spectra. A plurality of pairs of exit slits, each designated 128, 130 transmit isolated pairs of wavelengths of the pair of spectra from grating 126. A plurality of pairs of mirrors 132, 134 are provided to deflect the pairs of wavelengths to a photocell 136. Shutters 122 and 124 are operated at different frequencies by a suitable control unit 125 so that the spectra emanating from gaps 112 and 114 are modulated at different frequencies. Thus the two wavelengths reaching any particular photocell 136 are modulated at different frequencies, the amplitudes of which may be determined by a suitable discriminator 138 and indicator 140. Source 116 transmits monitor radiation through a third electro-optic shutter 142 and a third entrance slit 144 to grating 126. This monitor radiation is diffracted in such a way that a component is directed through a pair of offset exit slits 146 and 148 to a pair of photo-cells 150 and 152. The resulting signals are applied to a servo-mechanism 154 which controls the orientation of grating 126 as at 156. A suitable control 158 synchronizes the operation of source 116, phototubes 150 and 152 and servo-mechanism 154.

The present invention thus provides a highly precise direct readout for a spectrometer capable of comparing an unknown sample, the composition of which is approximately known, with a standard, the composition of which is precisely known, by using the method of differences. Since certain changes may be made in the above disclosed subject matter without departing from the scope of the invention herein involved, it is intended that all matter contained in the above description and shown in the accompanying drawings shall be interpreted in an illustrative and not in a limiting sense.

What is claimed is:

1. A spectrometer comprising an electrical excitaiton specimen gap for emitting specimen radiation and an electrical excitation standard gap for emitting standard radiation, said specimen gap being for the reception of a metallic sample of relatively roughly known composition, said standard gap containing a metallic standard of relatively precisely known composition, entrance means providing at least one slit for transmitting specimen radiation from said specimen gap and for transmitting standard radiation from said standard gap, diffraction grating means for dispersing said specimen radiation from said entrance means into a specimen spectrum and for dispersing said standard radiation from said entrance means into a standard spectrum, exit means providing at least a series of slits for transmitting lines of specimen radiation from said specimen spectrum and lines of standard radiation from said standard spectrum, sensing means providing at least a series of photocells for transducing said lines of specimen radiation into specimen signals and said lines of standard radiation into standard signals, and comparator means for combining said specimen signals and standard signals to produce indications of values of said specimen signals related to certain proportions of said composition of said specimen.

2. The spectrometer of claim 1 wherein said standard gap is defined by a pair of electrodes and said specimen gap is defined by a pair of electrodes, and wherein there are included circuit means for generating high voltage across said standard gap and said specimen gap at once, and an air gap in said circuit means for chopping said high voltage, said entrance means providing a pair of entrance slits for transmitting said specimen radiation from said specimen gap and for transmitting said standard radiation from said standard gap simultaneously, said exit means providing pairs of exit slits for transmitting pairs of specimen lines and standard lines; said indicator means including pairs of photo-cells for receiving said pairs of specimen lines and standard lines.

3. The spectrometer of claim 1 wherein said standard gap is defined by a pair of electrodes and said specimen gap is defined by a pair of electrodes, and wherein there are included circuit means for generating high voltage across said standard gap and said specimen gap, a mechanical chopper for alternately directing said specimen radiation and said standard radiation through said entrance means, a series of mechanical choppers for alternately directing said specimen lines and said standard lines to said photocells, and switch means for alternately directing said specimen signals and said standard signals to aid comparator, said first-mentioned mechanical chopper and said series of mechanical choppers being synchronized.

4. The spectrometer of claim 1 wherein said standard gap is defined by a pair of electrodes, and wherein there are included circuit means for generating high voltage across said standard gap and said specimen gap, a pair of choppers for modulating said specimen radiation and said standard radiation at different frequencies, said photocells producing different frequencies in consequence thereof, and discriminator means for distinguishing said different frequencies.

References Cited by the Examiner
UNITED STATES PATENTS

| | | | |
|---|---|---|---|
| 1,806,199 | 5/31 | Hardy et al. | 88—14 |
| 2,453,164 | 11/48 | Swings | 88—14 |
| 2,525,445 | 10/50 | Canada | 88—14 |
| 2,547,212 | 4/51 | Jamison et al. | 88—14 |
| 2,920,485 | 1/60 | Derganc | 88—14 |
| 2,975,669 | 3/61 | Jarrell et al. | 88—14 |
| 3,090,278 | 5/63 | Saunderson | 88—14 |

FOREIGN PATENTS 177,517 12/61 Sweden.

JEWELL H. PEDERSEN, *Primary Examiner.*